United States Patent [19]

Iwane

[11] Patent Number: 4,779,979
[45] Date of Patent: Oct. 25, 1988

[54] AUTOMATIC LENS METER

[75] Inventor: Toru Iwane, Yokohama, Japan

[73] Assignee: Nippon Kogaku K. K., Tokyo, Japan

[21] Appl. No.: 120,106

[22] Filed: Nov. 13, 1987

[30] Foreign Application Priority Data

Nov. 20, 1986 [JP] Japan .................................. 61-277603

[51] Int. Cl.$^4$ .............................................. G01B 9/00
[52] U.S. Cl. ..................................... 356/125; 356/127
[58] Field of Search ................ 356/124, 125, 126, 127

[56] References Cited

U.S. PATENT DOCUMENTS 4,534,645  8/1985  Nohda .................................. 356/125

Primary Examiner—F. L. Evans
Attorney, Agent, or Firm—Shapiro and Shapiro

[57] ABSTRACT

An apparatus for measuring the optical characteristics of a lens disposed in a measuring optical system illuminated by the beams of a plurality of light sources, the apparatus includes photoelectric detecting means having a detecting surface disposed substantially orthogonal to the optical axis of the measuring optical system for detecting the positions of the light beams passed through the lens and producing a photoelectric signal, optical characteristic calculating means responsive to the signal to calculate the spherical power, the cylindrical power and the principal meridians axis degree of the lens, deviation detecting means responsive to the signal to detect the amount of deviation of the central position of the light beams passed through the lens from the position of the optic axis of the measuring optical system, eccentricity calculating means for calculating the eccentricity of the optic axis of the lens from the optic axis of the measuring optical system in a two-dimensional coordinates system on the basis of the amount of deviation detected and the spherical power, the cylindrical power and the principal meridians axis degree calculated, display means for displaying at least one of the spherical power, the cylindrical power and the principal meridians axis degree, means for detecting that the amount of deviation detected is greater than a predetermined value and outputting a detection signal, and inhibiting means responsive to the detection signal to inhibit the display means from displaying at least one of the calculated spherical power, cylindrical power and the principal meridians axis degree.

7 Claims, 5 Drawing Sheets

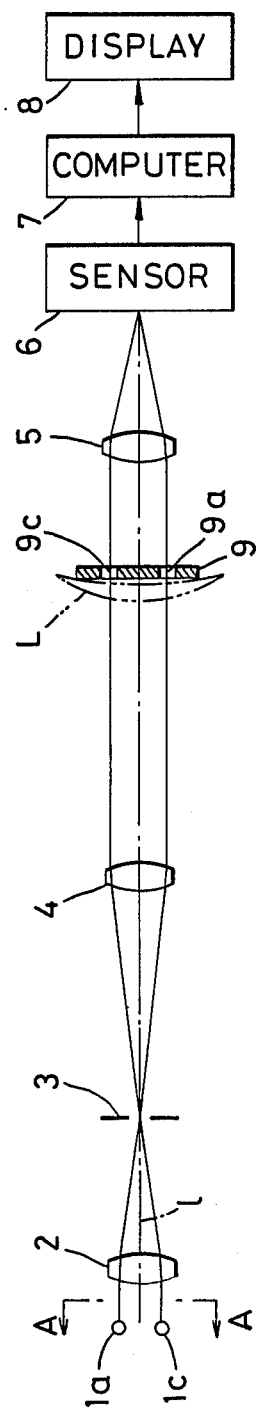
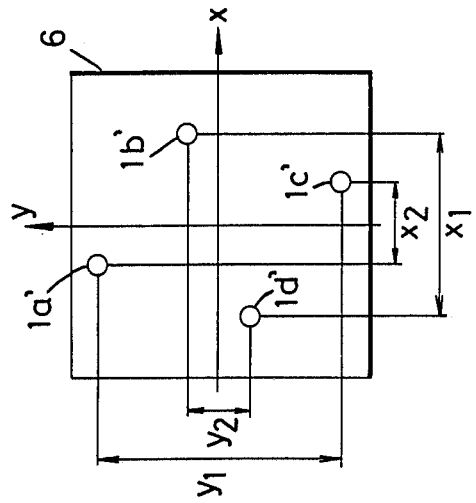
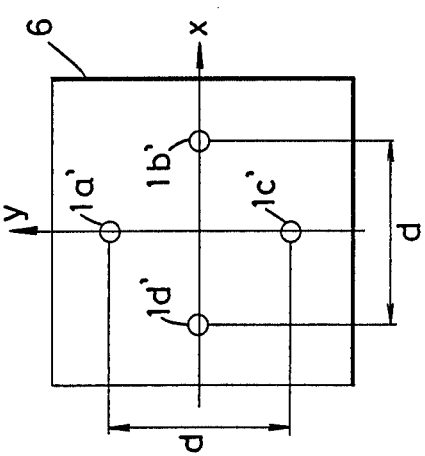
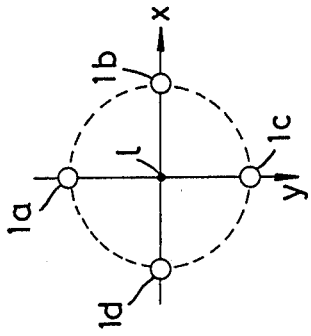

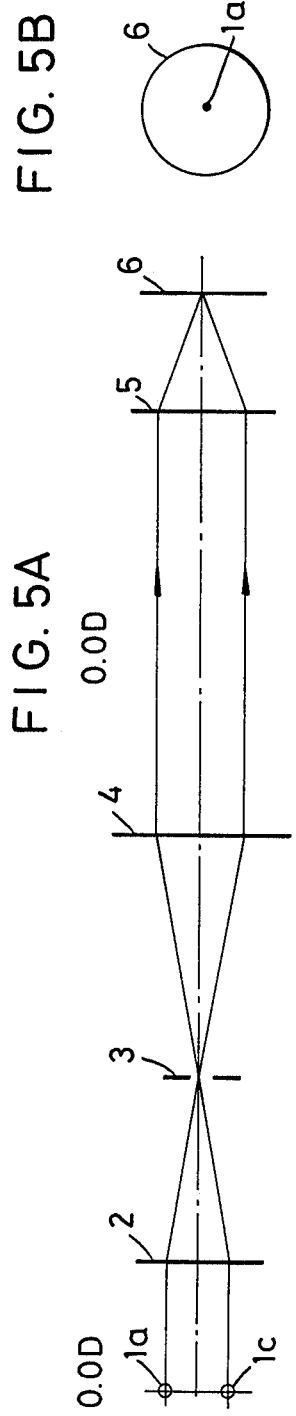
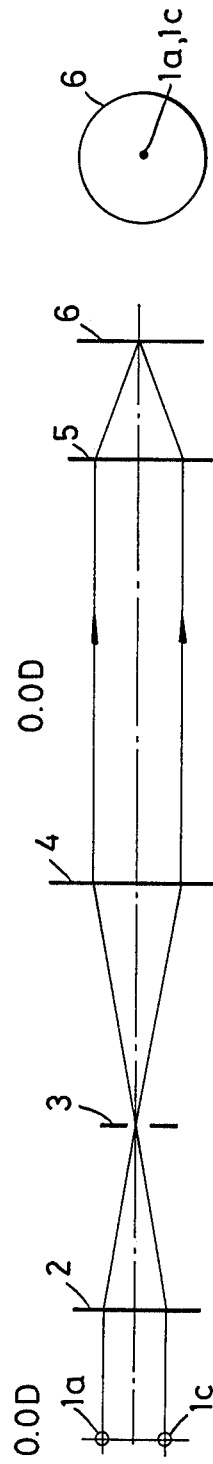
FIG. 5A 0.0D
FIG. 5B
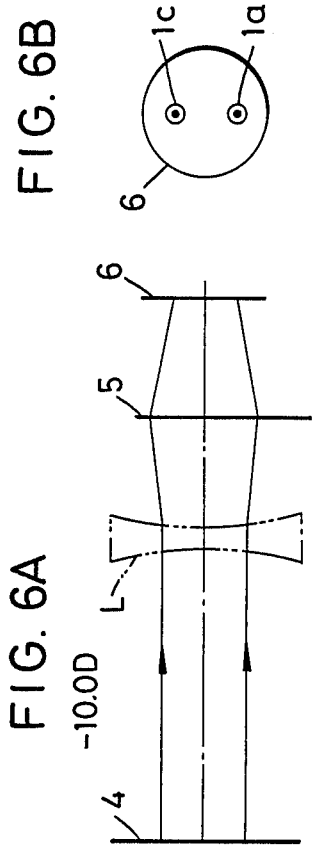
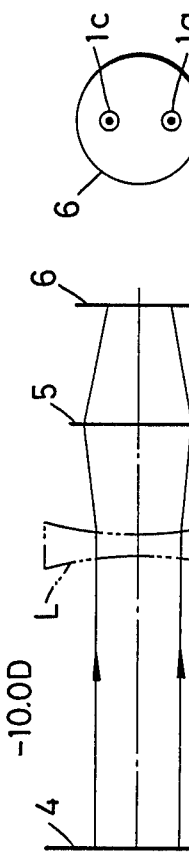
FIG. 6A −10.0D
FIG. 6B
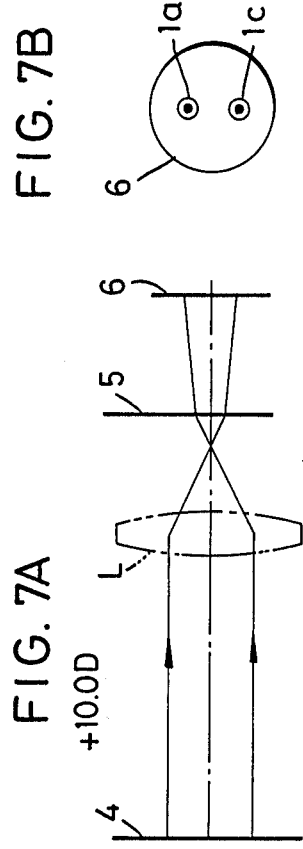
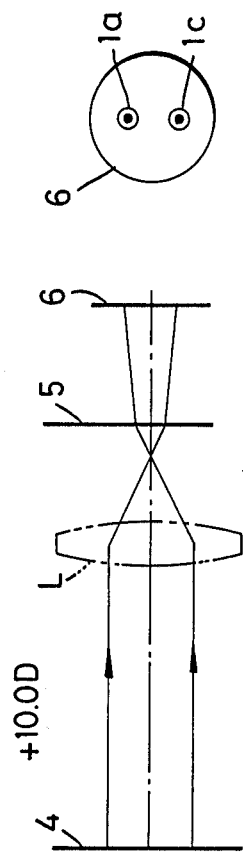
FIG. 7A +10.0D
FIG. 7B 4,779,979

AUTOMATIC LENS METER

BACKGROUND OF THE INVENTION

1. Field of the Invention

This invention relates to an automatic lens meter, and in particular to a lens meter capable of accurately measuring the amount of eccentricity of the optic axis of a lens to be examined with respect to the optic axis of a measuring optical system.

2. Related Background Art

There is known an automatic lens meter for finding, from the position of the light spot by a light beam transmitted through a lens to be examined inserted in a measuring optical system, the spherical power, the cylindrical power and the cylindrical axis degree of the lens to be examined and a prism component decomposed in X direction which provides the standard of the cylindrical axis degree and Y direction orthogonal thereto.

For example, in U.S. Pat. No. 4,534,645 the rearward focal plane of a first lens and the forward focal plane of a second lens are made coincident with each other and a pin-hole is provided there, the disposed position (inserted position) of a lens to be examined is formed rearwardly of the second lens, four point light sources are provided on a plane conjugate with said disposed position by said first lens and said second lens, a third lens is provided on the side opposite to said second lens with respect to said disposed position, a light-receiving element for image position detection is disposed at a position conjugate with said pin-hole by said second lens and said third lens, and a converting device is provided for converting a signal corresponding to the position of the light source image output from the light-receiving element to the degree and the principal meridians axis degree (the cylindrical axis degree) of the lens to be examined.

In such a lens meter, the deviation, i.e., the amount of eccentricity, between the optic axis of the measuring optical system and the optic axis of the lens to be examined has been indicated by the positional deviation of an optical image actually passed through the lens to be examined and bent by the prism thereof. That is, in the lens meter as disclosed in said U.S. patent, the amount of eccentricity is regarded as corresponding to the prism, and the movement distance (magnitude and direction) of the central position (this is the origin and the X, Y coordinates system is set in the direction in which two of the four optical images are arranged) of the four optical images spreading when a spherical lens as the lens to be examined is placed without eccentricity is the amount of eccentricity, or the coordinates position (by the above-mentioned X, Y coordinates system) at which a certain optical image should lie when there is no eccentricity is found from the degree and the cylindrical power (for which, for example, the X-axis is the standard of angle measurement) of the lens and the distance from the position at which the measured coordinates position should originally lie is the amount of eccentricity.

However, where the lens to be examined is a spherical lens, the prism and the amount of eccentricity exactly correspond to each other, but there has been the disadvantage that a correct amount of eccentricity is not obtained in an astigmatic lens, particularly, a lens called MIXC in which the spherical power is positive and the cylindrical power is negative.

SUMMARY OF THE INVENTION

It is the object of the present invention to overcome the above noted disadvantages and to provide an automatic lens meter in which an accurate amount of eccentricity can be obtained for any lens.

The apparatus of the present invention is an automatic lens meter for finding, from the position of the light spot by a light beam transmitted through a lens to be examined inserted in a measuring optical system, the spherical power S, the cylindrical power C and the cylindrical axis degree $\theta$ of the lens to be examined and a prism $P_X$, $P_Y$ decomposed in X direction which provides the standard of the cylindrical axis degree $\theta$ and Y direction orthogonal thereto, which lens meter is designed such that among said spherical power S, said cylindrical power C, said cylindrical axis degree $\theta$ and said prism $P_X$, $P_Y$, the following calculations are effected:

$$Z_X = \frac{1}{S(S+C)}\left[\left\{S + \frac{C}{2}(1 - \cos 2\theta)\right\}P_X + \left\{-\frac{C}{2}\sin 2\theta\right\}P_Y\right]$$

$$Z_Y = \frac{1}{S(S+C)}\left[\left\{-\frac{C}{2}\sin 2\theta\right\}P_X + \left\{S + \frac{C}{2}(1 + \cos 2\theta)\right\}P_Y\right]$$

and the values $Z_X$ and $Z_Y$ are made to correspond to the X direction component and the Y direction component, respectively, of the amount of eccentricity.

BRIEF DESCRIPTION OF THE DRAWINGS

FIG. 1 shows an optical system and a processing circuit according to an embodiment of the present invention.

FIG. 2 is a view taken along line A—A of FIG. 1.

FIG. 3 is a plan view showing light source images formed on a position sensor when the lens to be examined is a spherical lens.

FIG. 4 shows light source images formed on the position sensor when the lens to be examined is a lens including a cylindrical surface.

FIG. 5A shows the optical path when the lens to be examined is not inserted.

FIG. 5B shows the light source images on the position sensor in the case of FIG. 5A.

FIG. 6A shows the optical path when the lens to be examined is a concave lens.

FIG. 6B shows the light source images on the position sensor in the case of FIG. 6A.

FIG. 7A shows the optical path when the lens to be examined is a convex lens.

FIG. 7B shows the light source images on the position sensor in the case of FIG. 7A.

DESCRIPTION OF THE PREFERRED EMBODIMENT

Figure 8:
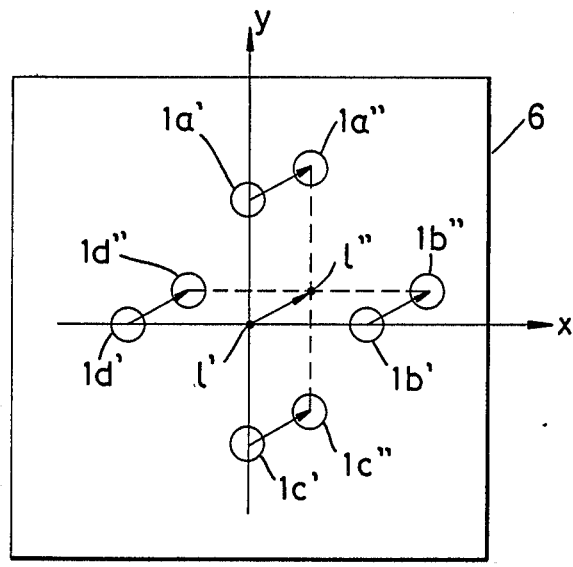
FIG. 8 illustrates the movement of the light source images on the position sensor when the lens to be examined is eccentric.

FIG. 1 shows an optical system and a processing circuit according to an embodiment of the present invention. There are four light sources (only two of which, 1a and 1c, are shown in FIG. 1). As seen from FIG. 2 which is a view taken along line A—A of FIG. 1, these light sources are equidistantly disposed on a circumference centered about an optic axis 1 supposed in a plane orthogonal to the optic axis 1, and are designated by 1a to 1d. The positions of the light sources 1a to 1d in the optical system are made substantially conjugate with four small apertures 9a to 9d (only 9a and 9c of which are shown in FIG. 1) formed in a lens bearer 9 provided at the inserted position of a lens L to be examined inserted in the optical system, by a condenser lens 2 having a backward focus on a pin-hole 3 and a collimator lens 4 having a forward focus on the pin-hole 3. The pairs of light sources 1a–1c are 1b–1d lying in the plane containing the optic axis 1 each form a pair. By providing the small apertures 9a–9d, clearer images of the light sources 1a–1d can be formed. The position of the pin-hole 3 is made conjugate with the surface of a position sensor 6 by the collimator lens 4 and an imaging lens 5. Accordingly, the spatial images of the light sources 1a to 1d are formed at the inserted position of the lens L to be examined, and the image of the pin-hole 3 is formed on the position sensor 6. That is, the pair of light sources 1a–1c are imaged on the position sensor 6 as shown in FIG. 5B by an optical path as shown in FIG. 5A. The position sensor 6 outputs signals corresponding to the positions of the images thereon, and a computer 7 as a converting circuit receives as inputs signals corresponding to the positions and calculates the amounts of eccentricity $Z_X$ and $Z_Y$, and a display device 8 displays those values. When the lens L to be examined is inserted into the optical path, the conjugate relation between the position of the pin-hole and the position of the position sensor 6 breaks and therefore, four images are formed on the position sensor 6 correspondingly to the light sources 1a to 1d. That is, where the lens to be examined is a concave lens, the lights having left the pair of light sources 1a–1c reach the position sensor 6 by an optical system as shown in FIG. 6A, and where the lens to be examined is a convex lens, the lights having left the pair of light sources 1a–1c reach the position sensor 6 by an optical path as shown in FIG. 7A. In FIGS. 6A and 7A, the light sources 1a–1d, the lens 2, the pin-hole 3 and the optical path therein are omitted. Each image becomes a blurred image on the sensor 6 as shown in FIGS. 6B and 7B.

Assuming that the lens L to be examined in the optical path is a spherical lens, the distance between the images 1a' and 1c' of the pair of light sources 1a and 1c on the position sensor 6 and the distance between the images 1b' and 1d' of the pair of light sources 1b and 1d on the position sensor 6 are equal to each other as shown in FIG. 3. If the distance between the images 1a' and 1c' and the distance between the images 1b' and 1d' are d and the distance between the spatial images of the light sources 1a and 1c formed at the inserted position of the lens L to be examined is do and the focal length of the collimator lens 5 is f and the refractive power of the lens L to be examined is D, when the position of the position sensor 6 is on the focus of the collimator lens 5, the following relation is established:

$$d = do \cdot f / 1000 \times D.$$

What is important here is that the distance d is proportional to the refractive power D and therefore, description will hereinafter be made with the proportion constant being 1 for simplicity. The distance d is thus in a proportional relation with the refractive power D and therefore, if the distance d on the position sensor is measured, the refractive power D of the lens L to be examined can be known.

However, if the lens L to be examined in the optical path includes a cylindrical surface, not only the distance between the images 1a' and 1c' of the pair of light sources 1a and 1c on the position sensor 6 and the distance between the images 1b' and 1d' of the pair of light sources 1b and 1d are not equal to each other, but as shown in FIG. 4, under the influence of torsion, there is formed an image in a direction inclined by an angle corresponding to the principal meridian direction of the cylindrical lens with respect to the directions X and Y of the pair of images when a spherical lens is inserted as the lens L to be examined.

Also, the prism components $P_X$ and $P_Y$ of the lens L to be examined are found on the basis of the amount of deviation of the centers of the optical images 1a'–1d' relative to the point of intersection 1' between the X-axis and the Y-axis, as shown in FIG. 8. That is, since the position sensor 6 finds the positions of the centers of gravity of the quantities of light of the optical images, the output of the position sensor 6 when the optical images 1a'–1d' are produced is a coordinates signal indicative of the central position of the optical images 1a'–1d'. Incidentally, to find the coordinates positions of each light spot, the four light sources 1a–1d may be alternatively driven and the then coordinates signal may be regarded as being representative of the coordinates signal of the optical image corresponding to the light source which is turned on.

Now, if the lens to be examined is eccentric as shown in FIG. 8 and the optical images are driven on the position sensor 6 as indicated at 1a''–1d'', the position of the center 1'' thereof may be obtained as the output of the position sensor 6.

Accordingly, if the coordinates of the central position 1' of the optical images 1a'–1d' are $x_0$, $y_0$ and the coordinates of the central position 1'' of the optical images 1a''–1d'' are $x_0'$, $y_0'$, $P_X = x_0' - x_0$ and $P_Y = y_0' - y_0$. Of course, by $x_0$, $y_0$ being origins 0, 0, $P_X = x_0'$ and $P_Y = y_0'$. That is, the prism components are $x_0'$ and $y_0'$.

Now, where the lens L to be examined is a spherical lens, the deviation between the optic axis 1 of the measuring optical system and the optic axis of the lens L to be examined, i.e., the amount of eccentricity, is in a proportional relation with the prism components and therefore, the amount of eccentricity can be represented by the prism components measured as described above. However, if there is an astigmatism in the lens L to be examined, the optical images 1a'–1d' on the position sensor 6 are subjected to the influence of torsion as shown in FIG. 4 and therefore, not only the proportional relation between the deviation between the optic axis 1 of the measuring optical system and the optic axis of the lens L to be examined, i.e., the amount of eccentricity, and the prism components breaks, but also in a special astigmatic lens (for example, MIXC), correspondency becomes entirely null.

Thus, in the measurement preparing operation wherein the optic axis 1 of the measuring optical system is aligned with the optic axis of the lens L to be examined, it becomes difficult to exactly represent the amount of eccentricity by only the prism components $P_X$, $P_Y$.

So, the following is considered in the present invention. In the optical system of FIG. 1, paying attention to a certain optical image (e.g., $1a'$) on the position sensor 6, what are in a proportional relation with the position X thereof on the position sensor 6 (which is one-dimensionally considered for simplicity, and the position $1'$ is regarded as the origin) are the diopter D of the lens to be examined, the position of the light beam which causes said optical image on the rear surface of the lens to be examined to be produced, i.e., the position a of the small aperture 9a in the lens bearer 9 (the position through which the optic axis 1 passes is the origin) and the prism P, and the position X can be expressed as $$X \propto D \quad (1)$$

$$X \propto a \quad (2)$$

and further, from expressions (1) and (2), $$X \propto D \cdot a. \quad (3)$$

The element of the diopter D is already included in the prism amount P and it is independent of the position a of the light beam and therefore, the following equation is established:

$$X = k_1 \cdot D \cdot a + k_2 \cdot P \quad (4)$$

where $k_1$ and $k_2$ are constants.

If this equation (4) is two-dimensionally expanded, there is obtained the following equation:

$$\mathbb{X} = k_1 \, \mathbb{D} \, \mathbb{L} + k_2 \, \mathbb{P} \quad (5)$$

The prism matrix $\mathbb{P}$ is $$\mathbb{P} = \begin{bmatrix} P_X \\ P_Y \end{bmatrix}.$$

Since a spherical component $\mathbb{S}$ and a cylindrical component $\mathbb{C}$ are additionally included in the conversion of the diopter matrix $\mathbb{D}$, the spherical component $\mathbb{S}$ which effects isotropic conversion is defined as $$\mathbb{S} = \begin{bmatrix} S & 0 \\ 0 & S \end{bmatrix}. \quad (6)$$

As regards the cylindrical component $\mathbb{C}$, if the angle component is not taken into consideration, it is apparent from expression (6) that $$\mathbb{C} = \begin{bmatrix} C & 0 \\ 0 & 0 \end{bmatrix} \quad (7)$$

Considering the angle component for this cylindrical component $\mathbb{C}$, with the matrix of rotation being $\psi$, $$\mathbb{C}' = \psi \, \mathbb{C} \, \psi^{-1} \quad (8)$$

and hence, the diopter matrix D can be expressed as follows:

$$\mathbb{D} = \mathbb{S} + \mathbb{C} = \begin{bmatrix} S + \frac{C}{2}(1 + \cos 2\theta) & \frac{C}{2}\sin 2\theta \\ \frac{C}{2}\sin 2\theta & S + \frac{C}{2}(1 - \cos 2\theta) \end{bmatrix} \quad (9)$$

where $$\psi = \begin{pmatrix} \cos\theta & \sin\theta \\ -\sin\theta & \cos\theta \end{pmatrix}.$$

Herein considering the latter term of expression (5), the prism $\mathbb{P}$ can be expressed as
$$\mathbb{P} = \mathbb{D}\,\mathbb{Z}$$
where $\mathbb{Z}$ is the amount of eccentricity, and hence, expression (5) can be expressed as follows:

$$\mathbb{X} = k_1 \mathbb{D}\mathbb{L} + k_2 \mathbb{D}\mathbb{Z} \quad (10)$$

In the lens meter, the coordinates of light beams (i.e., the coordinates of the small apertures 9a–9d in the lens bearer 9) are $$\mathbb{L}_1 = \begin{bmatrix} a \\ 0 \end{bmatrix} \quad \mathbb{L}_2 = \begin{bmatrix} 0 \\ a \end{bmatrix} \quad (11)$$

$$\mathbb{L}_3 = \begin{bmatrix} -a \\ 0 \end{bmatrix} \quad \mathbb{L}_4 = \begin{bmatrix} 0 \\ -a \end{bmatrix}.$$

Also, the position $\mathbb{X}$ of the optical images on the position sensor 6 which correspond $\mathbb{L}_1 - \mathbb{L}_4$, that is, $$\mathbb{X} = \begin{bmatrix} x \\ y \end{bmatrix},$$

is found by the measuring system 6, 7 and therefore, S, C and $\theta$ are found from $\mathbb{X}$ corresponding to $\mathbb{L}_1 - \mathbb{L}_4$ and expressions (9) and (10) and as a result, the diopter matrix $\mathbb{D}$ can be known by calculation.

Also, the diopter matrix $\mathbb{D}$ and the prism matrix $\mathbb{P}$ are found, whereby the amount of eccentricity $\mathbb{Z}$ can be determined from $\mathbb{P} = \mathbb{D}\mathbb{Z}$ if $\mathbb{D}$ is regular.

The condition which the diopter matrix $\mathbb{D}$ is regular is $$|\mathbb{D}| \neq 0, \quad (12)$$

that is, from expression (9), $$S \cdot (S + C) \neq 0. \quad (13)$$

This shows that the diopter matrix $\mathbb{D}$ becomes irregular when the refractive power of at least one of the two meridians of the lens is 0. That is self-evident.

If the diopter matrix $\mathbb{D}$ is regular, the amount of eccentricity can be found as $$\mathbb{Z} = \mathbb{D}^{-1} \mathbb{P}, \quad (14)$$

where $D^{-1}$ is $$D^{-1} = \frac{1}{S(S+C)} \cdot \begin{bmatrix} S + \frac{C}{2}(1 - \cos 2\theta) & -\frac{C}{2} \sin 2\theta \\ -\frac{C}{2} \sin 2\theta & S + \frac{C}{2}(1 + \cos 2\theta) \end{bmatrix} \quad (15)$$

When the diopter matrix $D$ is not regular, that is, when
$S \cdot (S+C) = 0$,
the refractive power of at least one of the two meridians is 0 and therefore, considering that $S=0$ and $C \neq 0$, this lens is a semi-circular lens and the amount of eccentricity $Z$ is not determined.

However, assuming that the absolute value from the axis of the semi-circular lens is the amount of eccentricity, the thus determined amount of eccentricity is expressed in terms of scalar as follows:

$$|Z| = P/C \quad (16)$$

where $P = \sqrt{P_{X2} + P_{Y2}}$.

Here, defining the amount of eccentricity as the shortest distance from the axis, the amounts of eccentricity $Z_X$, $Z_Y$ can be readily found by the following equations (17) and (18):

$$Z_X = |Z| \cos \theta = P/C \cdot \cos \theta = P_X/C \quad (17)$$

$$Z_Y = |Z| \sin \theta = P/C \cdot \sin \theta = P_Y/C \quad (18)$$

Figure 9B:
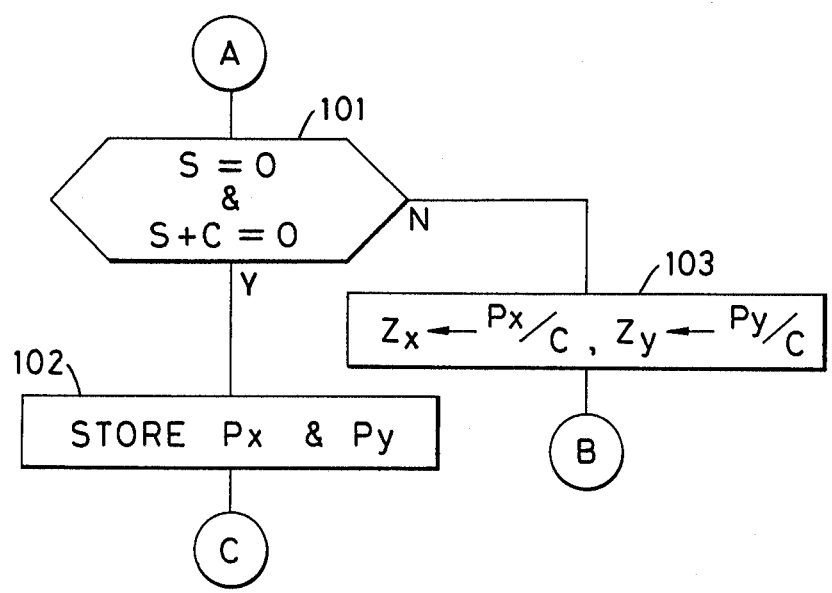
FIGS. 9A and 9B are flow charts when the amount of eccentricity of the computer used in FIG. 1 and alignment are displayed.
Figure 9A:
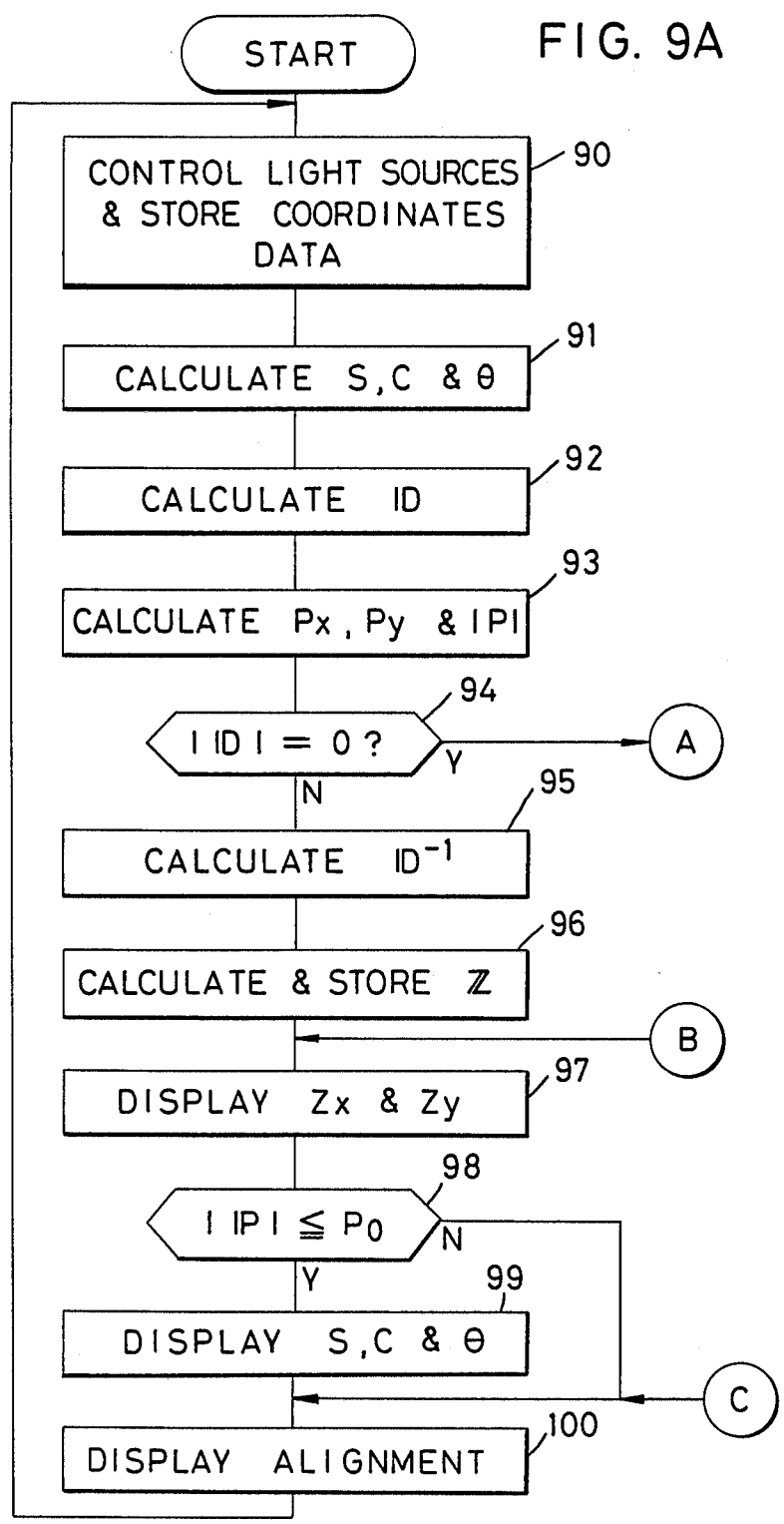

Accordingly, the computer 7 displays the amounts of eccentricity by the flow charts as shown in FIGS. 9A and 9B.

Figure 10A:
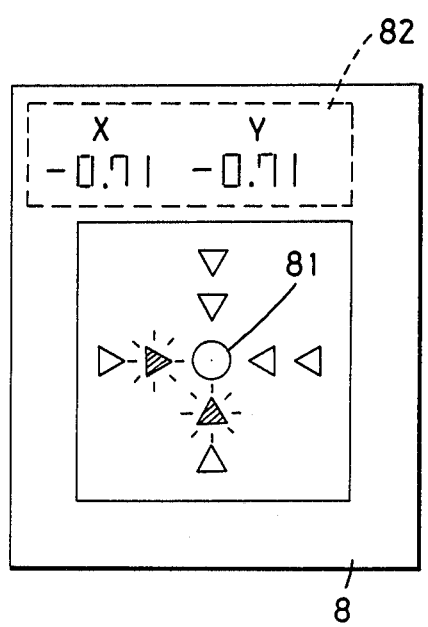
FIGS. 10A and 10B show examples of the display by a display device.
Figure 10B:
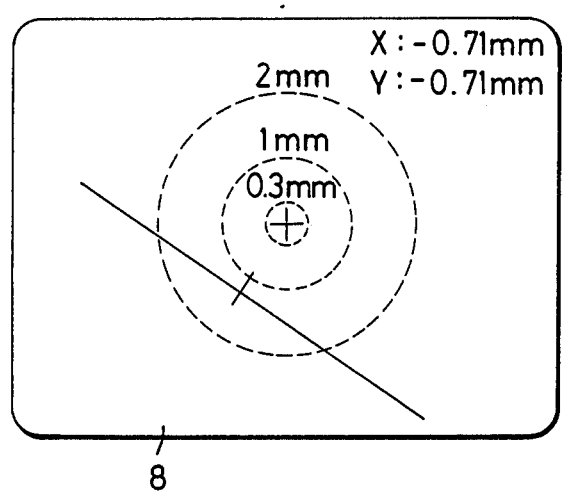

At step 90, the computer 7 turns on the light sources $1a$–$1d$ one after another and stores in the internal memory thereof the data of the coordinates values of the optical images $1a'$–$1d'$ obtained from the position sensor 6. At step 91, S, C and $\theta$ of the lens L to be examined are calculated. Then, at step 92, the diopter matrix $D$ is calculated on the basis of expression (9). Further, at step 93, the prism components $P_X$, $P_Y$ are calculated from the coordinates of the central position of the four optical images, and further, the absolute value $|P|$ of the prism components is calculated. Then, at step 94, whether the diopter matrix $D$ is regular is determined on the basis of expression (12). If the diopter matrix $D$ is regular, the inverse matrix of the diopter matrix is calculated on the basis of expression (15) at step 95. At step 96, the amount of eccentricity $Z$ is calculated on the basis of expression (14) and the obtained $Z_X$ and $Z_Y$ are stored as the amount of eccentricity in the internal memory M for display, and at step 97, the content of the internal memory M is displayed in the unit of millimeter by the display device 8. Now, when the absolute value $|P| = \sqrt{P_{X2} + P_{Y2}}$ of the prism components exceeds a predetermined value $P_0$, the reliability of the values of S, C and $\theta$ is low and therefore, at step 98, determination of $|P|$ is effected. When $|P|$ exceeds $P_0$, display of S, C and $\theta$ is not effected, and if $|P|$ is less than $P_0$, the values of S, C and $\theta$ calculated at step 99 are displayed by the display device. At step 100, display is effected by an alignment indicator provided in the display device 8, on the basis of $Z_X$ and $Z_Y$ stored in the internal memory M. Examples of the display device 8 are shown in FIGS. 10A and 10B. In FIG. 10A, the central light-emitting diode 81 displays the completion of alignment (the state in which the optic axis 1 of the measuring optical system is coincident with the optic axis of the lens L to be examined) by turn-on, and triangular light-emitting diodes provided with their centers facing in X direction and Y direction, respectively (total eight diodes, each two in the positive and the negative of the X and Y directions) are turned on for each predetermined amount of eccentricity in that direction, and it is shown that if they are moved in the directions in which the triangles are directed, by an amount displayed by a numerical display portion 82, alignment is completed.

According to such display, the eccentricity of the lens can be sensuously grasped and therefore, alignment is easy to accomplish.

FIG. 10B shows a form of display in which concentric circles indicative of the amounts of eccentricity are displayed on CRT and the eccentricity is indicated with an index mark such as a cross superposed thereon. By such display, the lens can accurately be positionally monitored.

On the other hand, when at step 94, it is judged that the diopter matrix is not regular, it is discriminated at step 101 whether the spherical power S is zero and the sum of the spherical power S and the cylindrical power C is zero. If the two are satisfied, the amount of eccentricity is not determined and therefore, at step 102, the prism components $P_X$ and $P_Y$, instead of $Z_X$ and $Z_Y$, are stored in the internal memory M and the prism components are displayed as the basic amount of alignment by the display device 8, and if at step 101, NO is judged, the amount of eccentricity $=(Z_X, Z_Y)$ is calculated from expressions (17) and (18) at step 103, and is displayed at step 100.

As described above, utilization of the present invention not only enables the amount of MIXC which could heretofore not be measured to be measured and displayed and makes alignment possible, but also can realize a predetermined alignment sense which does not depend on the degree of the lens to be examined. This shows that the optical prism amount can be converted to a positional and mechanical measure.

Further, if the present invention is used as a tool, it will become a useful measuring tool for the manufacture of lenses in which manufacturing error is usually allowed in the unit of mm, such as the error measurement and manufacture of lenses which are rectangular is shape and eccentric and in which manufacturing error is allowed in the unit of mm (such as the viewfinder lenses of cameras).

I claim:

1. An apparatus for measuring the optical characteristics of a lens to be examined disposed in a measuring optical system by applying light beams from a plurality of light sources to said disposed lens to be examined through a portion of said measuring optical system, including:
   a. photoelectric detecting means having a detecting surface disposed on the side opposite to said plurality of light sources with respect to said disposed lens to be examined so as to be substantially orthogonal to the optic axis of said measuring optical system, said photoelectric detecting means detecting the positions on said detecting surface of the light beams from said plurality of light sources passed through said lens to be examined and the other portion of said measuring optical system and producing a photoelectric signal;

b. optical characteristic calculating means responsive to said photoelectric signal to calculate the spherical power, the cylindrical power and the principal meridians axis degree of said lens to be examined;

c. deviation detecting means responsive to said photoelectric signal to detect the amount of deviation of the central position on said detecting surface of the light beams from said plurality of light sources passed through said lens to be examined and the other portion of said measuring optical system from the position of the optic axis of said measuring optical system;

d. eccentricity calculating means for calculating the eccentricity of the optic axis of said disposed lens to be examined from the optic axis of said measuring optical system in a two-dimensional coordinates system substantially orthogonal to the optic axis of said measuring optic axis on the basis of the amount of deviation detected by said deviation detecting means and the spherical power, the cylindrical power and the principal meridians axis degree calculated by said optical characteristic calculating means;

e. display means for displaying at least one of the spherical power, the cylindrical power and the principal meridians axis degree calculated by said optical characteristic calculating means;

f. means for detecting that the amount of deviation detected by said deviation detecting means is greater than a predetermined value and outputting a detection signal; and g. inhibiting means responsive to said detection signal to inhibit said display means from displaying at least one of said calculated spherical power, cylindrical power and principal meridians axis degree.

2. An apparatus according to claim 1, wherein said eccentricity calculating means produces a signal indicative of the coordinates conforming to the position of the optic axis of said lens to be examined on a two-dimensional plane substantially orthogonal to the optic axis of said measuring optical system centered about the optic axis of said measuring optical system, and said display means is responsive to said signal produced by said eccentricity calculating means to display the coordinates conforming to the position of the optic axis of said disposed lens to be examined in the two-dimensional coordinates system substantially orthogonal to the optic axis of said measuring optical system.

3. An apparatus according to claim 2, wherein said deviation detecting means calculates the coordinates of said central position in the two-dimensional coordinates system on said detecting surface with the optic axis of said measuring optical system as the origin, and said eccentricity calculating means calculates the coordinates indicated by said signal in accordance with the following equations:

$$Z_X = \frac{1}{S(S+C)} \left[ \left( S + \frac{C}{2}(1 - \cos 2\theta) \right) P_X + \left( -\frac{C}{2} \sin 2\theta \right) P_Y \right]$$

$$Z_Y = \frac{1}{S(S+C)} \left[ \left( -\frac{C}{2} \sin 2\theta \right) P_X + \left( S + \frac{C}{2}(1 + \cos 2\theta) \right) P_Y \right]$$

where
$Z_X, Z_Y$: the coordinates indicated by said signal
$S$: the spherical power of said lens to be examined
$C$: the cylindrical power of said lens to be examined
$\theta$: the principal meridians axis degree of said lens to be examined
$P_X, P_Y$: the coordinates of said central position on said detecting surface.

4. An apparatus according to claim 3, further having a member for placing said lens to be examined on the opposite side with respect to said detecting surface, said member being formed with the same number of openings as said plurality of light sources for passing therethrough the light beams from said plurality of light sources, the respective ones of said plurality of openings being optically conjugate with the respective ones of said plurality of light sources with respect to said portion of said measuring optical system.

5. An apparatus for measuring the optical characteristics of a lens to be examined disposed in a measuring optical system by applying light beams from a plurality of light sources to said disposed lens to be examined through a portion of said measuring optical system, including:

a. photoelectric detecting means having a detecting surface disposed on the side opposite to said plurality of light sources with respect to said disposed lens to be examined so as to be substantially orthogonal to the optic axis of said measuring optical system, said photoelectric detecting means detecting the positions on said detecting surface of the light beams from said plurality of light sources passed through said lens to be examined and the other portion of said measuring optical system and producing a photoelectric signal;

b. optical characteristic calculating means responsive to said photoelectric signal to calculate the spherical power, the cylindrical power and the principal meridians axis degree of said lens to be examined;

c. deviation detecting means responsive to said photoelectric signal to calculate the coordinates of the central position on said detecting surface of the light beams from said plurality of light sources passed through said lens to be examined and the other portion of said measuring optical system with the optic axis of said measuring optical system as the origin; and d. eccentricity calculating means for calculating the coordinates of the optic axis of said disposed lens to be examined on a two-dimensional plane substantially orthogonal to the optic axis of said measuring optical system with the optic axis of said measuring optical system as the origin on the basis of the coordinates calculated by said deviation calculating means and the spherical power, the cylindrical power and the principal meridians axis degree calculated by said optical characteristic calculating means.

6. An apparatus according to claim 5, wherein said eccentricity calculating means calculates on the basis of the following equations the coordinates of the optic axis of said disposed lens to be examined on the two-dimensional plane substantially orthogonal to the optic axis of said measuring optical system with the optic axis of said measuring optical system as the origin:

$$Z_X = \frac{1}{S(S+C)} \left[ \left\{ S + \frac{C}{2}(1 - \cos 2\theta) \right\} P_X + \left\{ -\frac{C}{2} \sin 2\theta \right\} P_Y \right]$$

$$Z_Y = \frac{1}{S(S+C)} \left[ \left\{ -\frac{C}{2} \sin 2\theta \right\} P_X + \left\{ S + \frac{C}{2}(1 + \cos 2\theta) \right\} P_Y \right]$$

where
- $Z_X$, $Z_Y$: the coordinates calculated by said eccentricity calculating means
- $S$: the spherical power of said lens to be examined
- $C$: the cylindrical power of said lens to be examined
- $\theta$: the principal meridians axis degree of said lens to be examined
- $P_X$, $P_Y$: the coordinates of said central position on said detecting surface.

7. An apparatus according to claim 5, further having a member for placing said lens to be examined on the opposite side with respect to said detecting surface, said member being formed with the same number of openings as said plurality of light sources for passing therethrough the light beams from said plurality of light sources, the respective ones of said plurality of openings being optically conjugate with the respective ones of said plurality of light sources with respect to said portion of said measuring optical system.

* * * * *